United States Patent [19]
de Neveu et al.

[11] 3,746,377
[45] July 17, 1973

[54] COUPLER

[75] Inventors: Lawrence W. de Neveu, New York, N.Y.; Bennet H. Connet, Huntington Park, Calif.

[73] Assignee: Lawrence W. de Neveu, New York, N.Y., Bennet H. Connet, Huntington Parks, Calif. (part interest)

[22] Filed: Mar. 17, 1971

[21] Appl. No.: 125,137

[52] U.S. Cl. .................. 287/2, 24/221 R, 24/81 E, 105/366 D
[51] Int. Cl. ............................................. F16b 7/00
[58] Field of Search .................. 287/2; 105/366 D, 105/366 C; 24/221 R, 221 A, 221 K, 81 E; 280/DIG. 8; 296/35 A; 248/361 R

[56] References Cited
UNITED STATES PATENTS
3,261,070  7/1966  Abolins ........................... 24/221 R
3,052,941  9/1962  Abolins ........................... 24/221 R
3,545,713  12/1970  Kinnelon et al ................ 248/361 R Primary Examiner—Andrew V. Kundrat
Attorney—Fulwider Patton Reiber Lee & Utecht

[57] ABSTRACT

A coupler for releasably connecting together a pair of structures at least one of which is characterized by a recess having an entry opening configured so that a locking means can be inserted through the opening and rotated in the recess. This prevents withdrawal of the locking means and thereby couples together the pair of structures. In the preferred embodiment the locking means includes a pair of locking heads for disposition in decoupling positions for insertion within confronting recesses in the pair of structures to be connected, the heads being normally keyed against rotation to their connecting or coupling positions by a pair of actuators. The actuators are compressed or urged together by the pair of structures as such structures are moved together, and these actuators release the locking heads for biased rotation to coupling positions. This secures the structures together. Decoupling follows manual rotation of the locking heads beyond their decoupling positions to reset positions. This actuates a reset means to keep the locking heads in their rotated, decoupling positions despite the compressed positions of the actuators. After initial separation of the two previously coupled structures, the reset means is disengaged and the actuators again key the heads against biased rotation to their coupling positions until the actuators are again compressed or moved toward one another.

11 Claims, 14 Drawing Figures

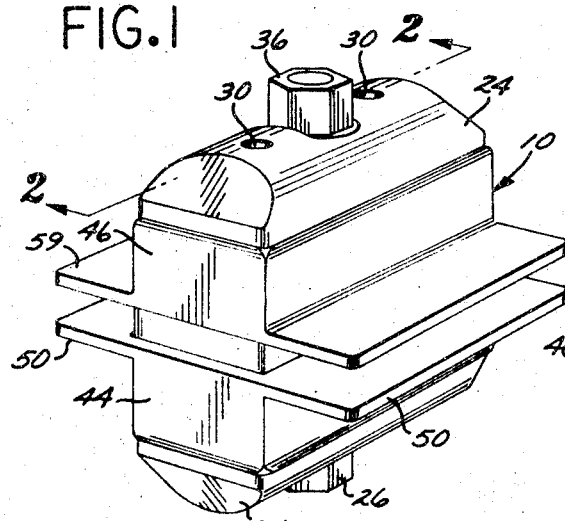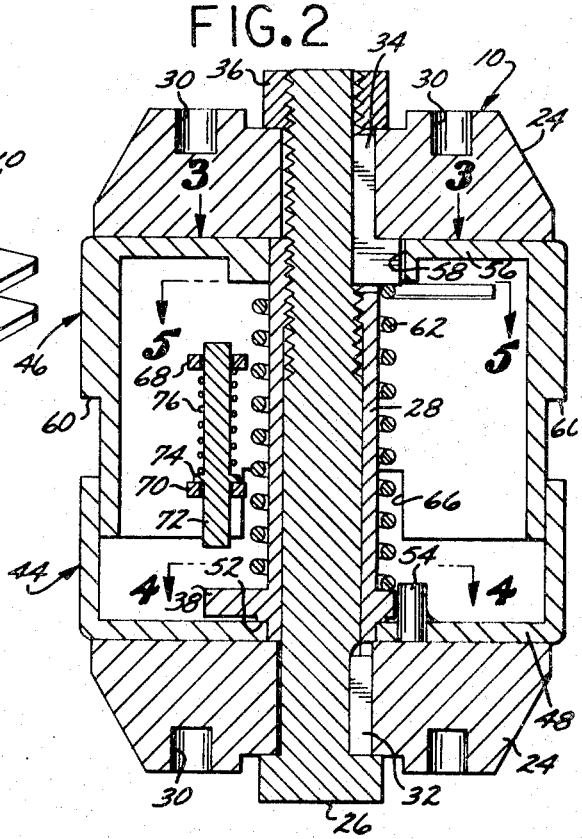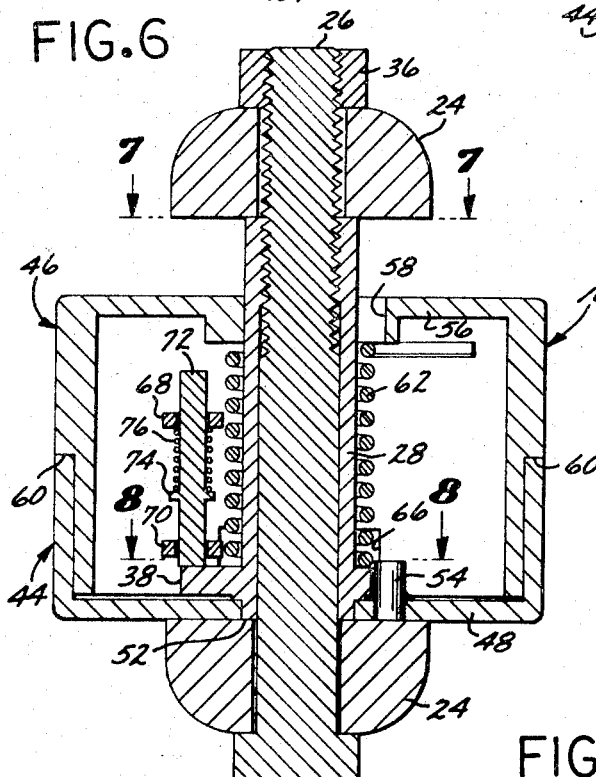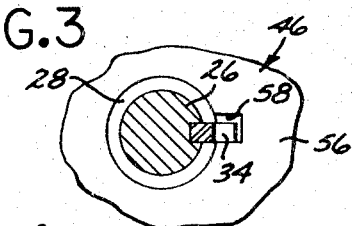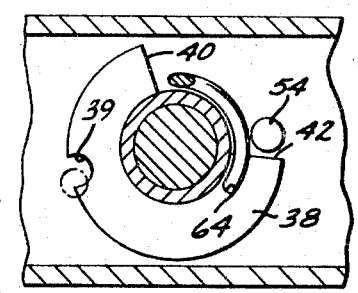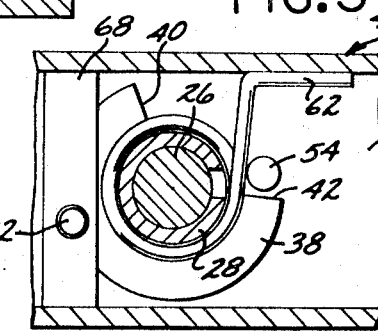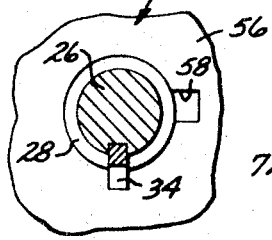

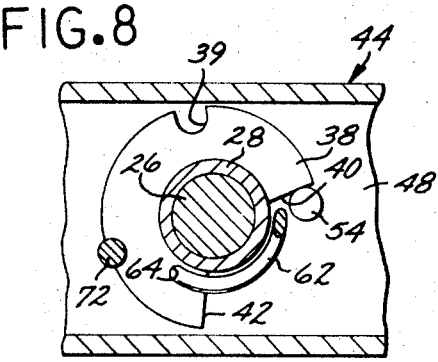
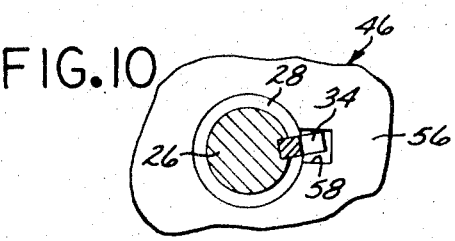
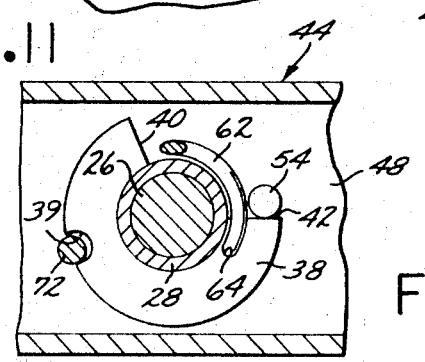
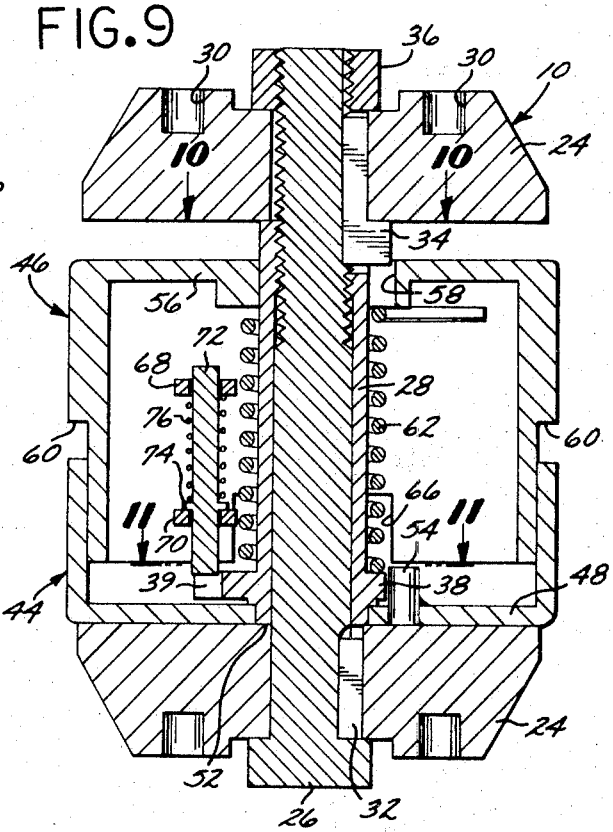
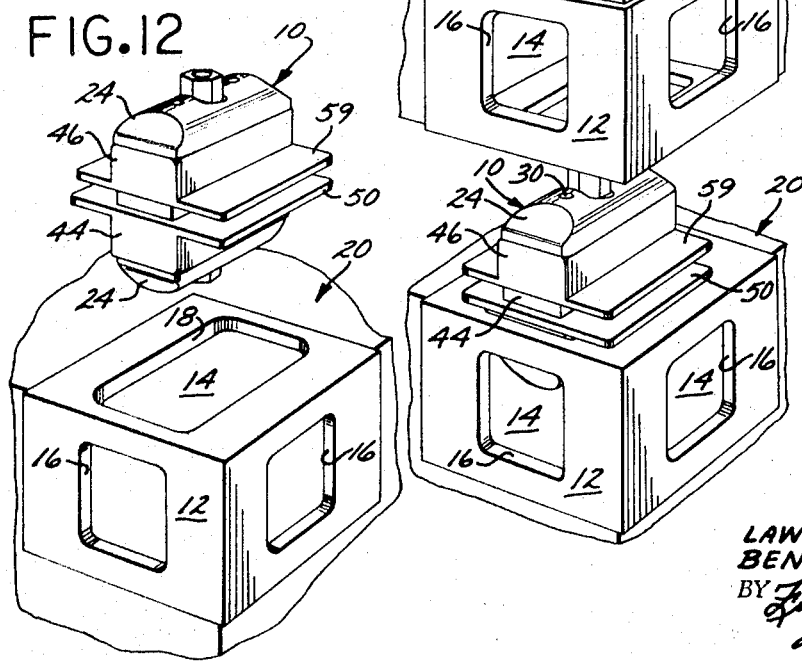
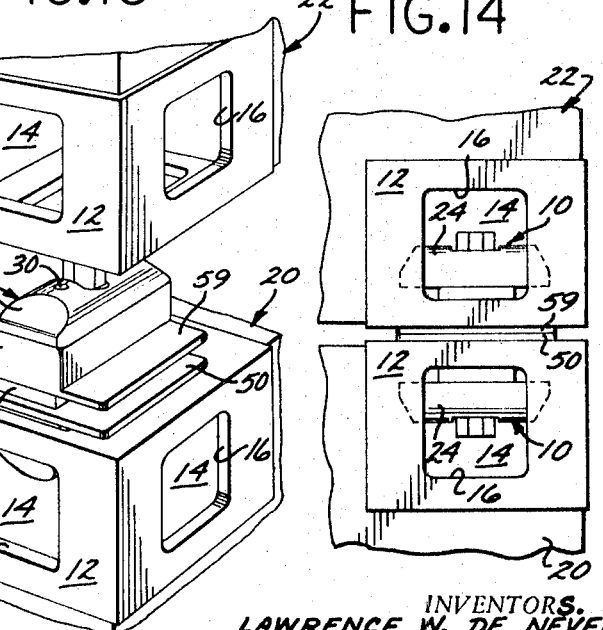
INVENTORS.
LAWRENCE W. DE NEVEU
BENNET H. CONNET
ATTORNEYS

COUPLER

BACKGROUND OF THE INVENTION

1. Field of the Invention

The present invention relates to a coupler, and more particularly to a coupler for releasably connecting together a pair of structures such as cargo containers.

2. Description of the Prior Art

Rapid, automatic coupling together of structures is important in many applications, but is particularly important to the efficient handling of structures such as cargo containers. These containers are already largely of standardized configuration and construction for this purpose. However, there is presently no satisfactory means for quickly and easily securing together such standardized containers automatically and in such a way that the coupling means does not have to bear the weight of the upper one or ones of the containers.

A cargo container of the type mentioned is generally characterized by corner castings which each have a recess provided with an elongated opening narrower than the recess. The handling or hoisting equipment is provided with devices which are projectable into the recesses. Rotation of the devices a quarter turn locks the devices within the recesses so that the container can be lifted by the four lines or cables of a usual sling. This type of handling is common in the transportation of such containers from ship to shore, and onto trucks, railroad flat cars and the like.

If a plurality of such containers could be lifted at one time there would obviously be a considerable savings in time and expense in the handling of cargo. However, the cargo containers are often extremely heavy and the forces acting upon the coupling devices are often so high that reliability of operation of such couplers poses a serious problem. Such devices as do exist are sometimes partly automatic, since some of the devices are actuated by movement of the cargo containers toward one another, but the devices are interposed between the containers in such a way that they space the containers apart and thereby bear the weight of the upper ones of the containers. Such spacing is required by such devices in order to decouple them. In any event, despite various attempts to solve the problem, cargo containers at the present time are usually individually hoisted and transported because of the lack of a completely satisfactory means for coupling cargo containers automatically. Even aboard ship there is no quick and efficient means for coupling the containers together during a voyage, and old fashioned lashing procedures are often still used.

SUMMARY

According to the present invention, a coupler is provided which is adapted to connect together structures such as cargo containers, although the invention is not limited to the coupling of cargo containers. It is adapted for connecting together any pair of structures which are characterized by recesses having elongated entry slots adapted to receive the locking heads of the present coupler. It is also adapted for use in coupling a structure such as a truck, hoist, helicopter or the like to another structure or container so that the container may be secured for transportation. In such a case the coupler would utilize only one locking head. In the more usual situation the coupler includes a pair of locking heads insertable within the recesses of the structures to be coupled. A bias means is provided to bias the locking heads toward coupling positions. However, a key means prevents biased rotation of the heads to such coupling positions until the key means is released as a result of compression or movement together of a pair of actuators rotatably mounting the locking heads. These actuators are moved by compression between the confronting surfaces of the containers as the containers move toward one another, and all except locating plate or flange portions of the actuators are received in the container recesses. When the first key means is released, and the locking heads are biased into their coupling positions, the containers are coupled together and can then be moved as a single unit. Since only the locating flanges or plates are interposed between the structures, the couplers do not have to be constructed heavily enough to bear the weight of the upper one of the coupled structures. However, receipt of the main portions of the couplers within the recesses means that the couplers desirably bear any shear loads, leaving the locking heads and associated components comparatively free to move without binding or similar restriction.

When it is desired to decouple the containers, the locking heads are manually rotated to a reset position slightly beyond the decoupled positions of the locking heads to thereby seat a second key means. The second key means prevents the heads from biased rotation back to their coupling positions despite the fact that the actuators are still compressed by the coupled containers. However, when the containers begin to move apart, the first key means again engages, and the second key means releases and takes over the task of constraining the locking heads against biased rotation into their coupling positions. Thus, the couplers are "recocked" or reset and therefore ready for automatic rotation of the locking heads to coupling positions whenever the actuators are again compressed or moved together by movement of a container against them.

Other objects and features of the invention will become apparent from consideration of the following description taken in connection with the accompanying drawings.

BRIEF DESCRIPTION OF THE DRAWINGS

FIG. 1 is a perspective view of a coupler according to the present invention;

FIG. 2 is an enlarged view taken along the line 2—2 of FIG. 1, and illustrating the components in the "cocked positions" prior to compression of the actuators;

FIG. 3 is a view taken along the line 3—3 of FIG. 2;

FIG. 4 is a view taken along the line 4—4 of FIG. 2;

FIG. 5 is a view taken along the line 5—5 of FIG. 2;

FIG. 6 is a cross sectional view like that of FIG. 2, but illustrating the actuators in their compressed positions, and with the locking heads rotated into their coupling positions;

FIG. 7 is a view taken along the line 7—7 of FIG. 6;

FIG. 8 is a view taken along the line 8—8 of FIG. 6;

FIG. 9 is a cross sectional view like that of FIG. 2, but illustrating the sequence of disengagement of the first and second key means as the actuators move toward their uncompressed or extended positions;

FIG. 10 is a view taken along the line 10—10 of FIG. 9;

FIG. 11 is a view taken along the line 11—11 of FIG. 9;

FIG. 12 is a perspective view on a reduced scale, illustrating the corner casting portion of a standard cargo container, the present coupler being shown as it would appear just prior to insertion into the corner casting recess;

FIG. 13 is a view similar to FIG. 12, but illustrating the present coupler in position in the corner casting recess of one container, and with the corner casting portion of a second container in close proximity as the second container is lowered toward the first container; and FIG. 14 is a showing on a reduced scale of the disposition of the present coupler in the two containers of FIG. 13, and showing how the pair of containers are coupled together.

DESCRIPTION OF THE PREFERRED EMBODIMENT

Referring now to the drawings, and particularly to FIGS. 1–5, there is illustrated a coupler 10 according to the present invention. The coupler 10 is adapted for use in securing together any suitable pair of structures characterized by recesses adapted to receive certain locking components of the coupler 10, as will become apparent. However, the coupler 10 is particularly suited for use in securing together standard cargo containers such as are now extensively used in loading, discharging, and securing of marine cargos.

The standard containers used in marine operations are generally box-like in configuration and each of the eight corners of such a container is characterized by an International Standard Organization (ISO) casting 12 forming an integral part of the container. Each casting 12 includes an internal cavity or recess 14 having a pair of generally square side openings 16 and an elongated or generally rectangular slot or upper opening 18. The size of each corner opening 18 is smaller than that of the associated recess 14 so that the locking component of the coupler 10 can be fitted into the recess 14 through the opening 18. Rotation of the locking component to locate the end portions thereof in underlying relation to the side margins of the opening 18 will then lock the component in position so that it cannot be withdrawn again without first being rotated back to its initial position.

Although the locking component of the coupler 10 is described in connection with receipt within the elongated, rectangular opening 18, it will be apparent that the configurations of the opening 18 and the locking component or components of the coupler 10 may vary as desired. All that is necessary in this regard is the provision of complemental configurations such that rotation of one relative to the other effects a locking of the associated structures until the complemental components are re-rotated to their original positions.

The coupler 10 will also be described in conjunction with the coupling of a pair of cargo containers 20 and 22 having the standard ISO corner castings 12. In such a case the coupler 10, as will be seen, is characterized by a pair of complemental locking components to fit within the confronting recesses 14 of the pair of cargo containers. However, the coupler 10 could be made as an integral part of a hoisting structure (not shown) for example, with a single locking component being utilized for insertion within a suitable recess in a container to be hoisted. Thus, the coupler 10 could be made part of a helicopter hoisting apparatus so that as the helicopter comes down upon the container, the single locking component would be received within the container recess whereby, upon rotation of the locking component, the container could be lifted by the helicopter. In short, the coupler usually includes two locking components, but there are occasions when only one locking component will suffice.

The foregoing is illustrative of the scope of the invention, and the present description will be directed to the coupling together of a pair of box-like containers by lowering one upon the other. The upper container 22 includes a casting 12 at each of its lower four corners, and the lower container 20 includes a similar casting 12 at each of its four upper corners. As will be apparent, a side-by-side coupling is also possible with either a different orientation of the containers, or by providing container corner castings configured to provide openings 18 at the sides as well as on their upper and lower surfaces.

With the coupling disposition of the containers 20 and 22 illustrated in FIGS. 12—14, a coupler 10 is associated with each of the recesses 14 of the four corner castings 12 of the lower container 20. As will be seen, the coupler 10 is actuated by movement together of the two structures to be coupled. Coupling does not take place unless there is proper alignment. Also, despite the high torques and loads which are usually present, the couplers 10 do not stick or bind because the movable portions of the coupler are free of this heavy loading. Moreover, whenever the containers 20 and 22 are decoupled, it will be noted that the couplers 10 are always "recocked" and ready for recoupling whenever the containers 20 and 22, or like containers, are brought into such proximity as will actuate the couplers 10.

Each coupler 10 comprises, generally, a pair of latching or locking heads 24 secured together in vertically spaced relation and for common rotation by a vertically elongated headed element or bolt 26 which is disposed through and threadedly secured to the internally threaded portion of a mounting sleeve 28. Each head 24 is generally rectangular and so dimensioned that it easily fits within the rectangular upper opening 18 of a corner casting 12. The head 24 includes chamfered ends and a transverse cross section which is generally semicircular or curved to facilitate insertion of the head 24 within the complemental recess 14 of a corner casting 12. For reasons which will become apparent later, each head 24 also includes a pair of blind bores 30 in the upper curved surface thereof.

The lower one of the heads 24 includes a central opening through which is slidably disposed the shank of the bolt 26, the head 24 abutting against the underside of the bolt head. The bolt 26 and the central opening in the lower head 24 are each provided with a keyway within which is disposed an elongated lower key 32 to key these parts together for rotation in common.

The upper locking head 24 also includes a central opening through which the shank of the bolt 26 is slidably disposed. Both the head 24 and the adjacent portion of the bolt 26 are provided with keyways within which an L-shaped upper key 34 is disposed so that the bolt 26 and the upper head 24 rotate in common. A threaded nut 36 is fitted upon the upper end of the bolt 26 and bears against a counterbore provided adjacent the central opening in the upper locking head 24.

The upper extremity of the central opening of the sleeve 28 is internally threaded for threaded disposition over the bolt 26. In addition, the upper end of the sleeve 28 includes a slot through which the horizontal portion of the L-shaped upper key 34 extends so that the sleeve 28 also rotates with the bolt 26 and the pair of locking heads 24.

The locking heads 24 seat upon the upper and lower ends of the sleeve 28 so that the sleeve 28 maintains the heads 24 in a predetermined vertically spaced relation.

The lower extremity of the sleeve 28 includes an integral circular flange 38 which, as best viewed in FIG. 4, includes an opening or detent 39 in the margin thereof. In addition, an arcuate portion of the flange 38 is cut away to provide a pair of stop surfaces or walls 40 and 42, the purpose of which will be discussed later.

The coupler 10 also comprises a pair of actuators 44 and 46 which rotatably mount the pair of locking heads 24. As will be seen, the actuators 44 and 46 engage or are engaged by the proximate or confronting surfaces of the pair of containers 20 and 22 to be coupled as the containers come together. Upon such engagement the actuators actuate the locking heads 24 for movement from their decoupling positions, as illustrated in FIGS. 1 and 2, to their coupled positions, as illustrated in FIG. 6.

The lower actuator 44 is an upwardly open box-like receptacle having a bottom wall 48, a pair of end walls, and a pair of side walls. The side walls extend laterally to define flat plate sections or engaging flanges 50 whose outer faces are adapted to rest upon that portion of the upper surface of a corner casting 12 of the lower container 20 which defines the side margins of the upper opening 18, as best viewed in FIG. 13.

The bottom wall 48 of the lower actuator 44 includes a central opening through which is disposed the bolt 26 and the lower end of the sleeve 28, the margins defining the central opening fitting within an undercut portion 52 of the sleeve 28 whereby the sleeve 28 and adjacent locking head 24 are rotatable, but constrained against vertical movement, relative to the lower actuator 44.

The actuator bottom wall 48 also includes an integral, vertically oriented pin 54 which is adapted to engage the stop walls 40 or 42, depending upon the rotated position of the flange 38 of the sleeve 28, as best viewed in FIG. 4.

The upper actuator 46, like the lower actuator 44, is generally box-like in shape, and is open downwardly. The actuator 46 includes an upper wall 56 having a central opening provided with a transverse key slot 58 for vertically slidably receiving the horizontally oriented portion of the L-shaped upper key 34, as best viewed in FIGS. 3 and 9.

The end and side walls of the upper actuator 46 are undercut to form a shoulder 60, as best viewed in FIG. 2, with the lower portion of the side and end walls slidably fitting within the end and side walls of the lower actuator 44. The upper edges of the side and end walls of the lower actuator 44 abut against the shoulder 60 of the side and end walls of the upper actuator 46 when the actuators 44 and 46 are compressed together, as seen in FIG. 6.

Normally the actuators 44 and 46 are biased away from one another to their uncompressed or extended positions by a compression spring 62 disposed about the sleeve 28. The lower extremity of the spring 62 engages the flange 38 of the sleeve 28, while the upper extremity of the spring 62 engages the upper key 34 and the adjacent portion of the upper actuator 46. The lower end of the spring 62 is bent downwardly and is disposed within an opening 64 provided in the sleeve flange 38 adjacent the stop wall 42, as best viewed in FIG. 4. The upper end of the spring 62 extends laterally, as viewed in FIGS. 2 and 5, and bears against one of the side walls of the upper actuator 46. With this arrangement the spring 62 not only biases the actuators 44 and 46 away from one another and into their extended positions, as seen in FIG. 2, but also acts as a torsion spring. The torsion is developed by appropriately locating and twisting the coupler components upon initial assembly. This exerts a preloading or bias tending to rotate the flange 38 relative to the actuators 44 and 46, and consequently this also tends to rotate the locking heads 24 in a clockwise direction, as viewed in FIGS. 1 and 4. Free rotation of the sleeve flange 38 when the actuators 44 and 46 are in their compressed positions, as illustrated in FIG. 6, is facilitated by providing the side walls of the upper actuator 46 with rectangular cut-out portions 66, as seen in FIG. 2. In addition, the upper actuator side walls are extended laterally at their lower margins to provide flat plate sections or engaging flanges 59 parallel to and immediately above the corresponding engaging flanges 50 of the lower actuator 44. These flanges 59 are adapted to engage the undersurfaces of the side margins defining the opening 18 in a corner casting 12 of the upper container 22.

A pair of vertically spaced apart support elements 68 and 70 are welded at their opposite ends to the side walls of the upper actuator 46 and include vertically aligned openings to slidably accommodate an elongated, vertically oriented pin 72. The pin 72 includes a flange 74 which rests upon the upper surface of the lower element 70, and a compression spring 76 is disposed about the pin 72 and between the flange 74 and the underside of the upper support element 68. As a consequence, the pin 72 is biased downwardly toward the position illustrated in FIG. 2. However, when the actuators 44 and 46 are moved into their compressed positions, as seen in FIG. 6, the lower end of the pin 72 abuts against the upper surface of the sleeve flange 38, which moves the pin 72 upwardly against the bias of the spring 76.

Assuming that the lower cargo container 20 rests upon the deck of a ship or the like, and that the upper container 22 is to be lowered upon the container 20 by means of usual hoisting equipment aboard the ship, four of the couplers 10 can be utilized to couple the containers together so that when the container 22 is hoisted, the lower container will be hoisted with it. More particularly, four couplers 10 are placed by hand upon the four corner castings 12 of the lower cargo container 20. The couplers 10 are illustrated in FIG. 12 as they would appear just prior to such insertion.

When the four couplers 10 are in proper position, the lower locking heads 24 will be located in the corner casting recesses 14, and the flanges 50 of the lower actuators 44 will be resting upon the side margins of the elongated upper openings 18 of the recesses 14, as seen in FIG. 13. When the upper container 22 is lowered into aligned position so that the upper locking heads 24 of the couplers 10 are received within the openings 18 in the underside of the container 22, the confronting parallel surfaces of the flanges 50 and 59 of the actuators 44 and 46 will begin to compress or be moved toward one another. This compression moves the actuators 44 and 46 from the positions shown in FIG. 2 to the positions shown in FIG. 6. On such compression, the upper key 34 moves upwardly out of the slot 58, freeing the locking heads 24 for rotation within their associated recesses 14 to coupling positions in which they are disposed transversely of the openings 18. In these positions, as seen in FIG. 6, the locking heads 24 cannot be removed from the recesses and the containers 20 and 22 are securely coupled together for hoisting in common. In the coupling positions of the locking heads 24 the upper key 34 is located above and completely out of the key slot 58, as best seen in FIG. 7, and the lower end of the pin 72 is compressed against the upper surface of the sleeve flange 38 just to one side of the detent 39, as best seen in FIG. 4.

It will be apparent that the upper locking head 24 can be eliminated for certain applications. For example, the upper extremity of the bolt 26 could be mounted to a hoisting apparatus, such as a helicopter, in such a way that it would be freely rotatable. Then, the upper locking head 24 can be inserted in the recess of some structure or container to be hoisted, and thereafter rotated for coupling in the same manner described above. However, the use of two locking heads 24 has the wider scope of use. In this regard, the heads 24 can also be disposed within side recesses of containers or the like for side-by-side coupling if desired, the stacked coupling previously described merely being exemplary. Moreover, whether the coupler 10 is disposed in the position illustrated in FIG. 2 or is reversed in an upside down position is immaterial to its operation, and any use of the terms "up" and "down" in the present description and the claims which follow is therefore solely for convenience.

Decoupling of the containers 20 and 22 is accomplished by reverse rotation of the locking heads 24. This is conveniently accomplished by insertion of a suitable tool (not shown) through the side openings 16 of the corner castings 12 and into one or the other of the bores 30 in one of the locking heads 24 of each coupler 10. The tool is used to rotate the heads 24 of each coupler 10 against the bias of the spring 62 and to a reset position just beyond the normal decoupling position which is illustrated in FIG. 2. In this reset position the sleeve flange 38 is rotated in a counterclockwise direction beyond the position of FIG. 4 to that shown in FIG. 11, in which position the pin 72 is biased by its spring 76 into the sleeve flange detent 39. In contrast, when the locking heads 24 are in their decoupling positions, the pin 72 is not quite seated within the detent 39, as seen in FIG. 4.

Once the locking heads 24 have been rotated sufficiently that the pin 72 is seated within the detent 39, the pin 72 prevents the locking heads 24 from rotating back under the bias of the spring 62. But for the pin 72, the locking heads 24 would simply rotate back once they were released by the operator, the upper key 34 at this time being up and out of the key slot 58, with the actuators 44 and 46 being compressed together under the weight of the upper container 22.

With the locking heads 24 rotated as just described, the upper container 22 can be hoisted away from the lower container 20, the upper locking heads 24 coming out of the corner recesses in the container 22 as this occurs. As best seen in FIG. 9, as the engaging flanges of the actuators 44 and 46 move apart relative to one another during the separation of the containers 20 and 22, the lower end of the lower pin 72 begins to rise out of the detent 39, which would free the locking heads 24 for rotation to their coupling positions. However, before this occurs, the upward movement of the upper actuator 46 first causes the upper key 34 to be received within the key slot 58. Consequently, when the pin 72 rises out of the detent 39, the upper key 34 takes over the task of keeping the locking heads 24 from rotating under the bias of the spring 62. Thus, after the containers 20 and 22 are completely separated, the locking heads 24 remain in "cocked" positions for immediate rotation to their coupling positions whenever another cargo container is lowered onto the lower container 20 in position to cause the flanges of the upper and lower actuators 44 and 46 to be moved together, as previously described.

FIG. 11 illustrates the function of the stop wall 42 in limiting the counterclockwise rotation of the locking heads 24 to thereby establish their reset positions. FIG. 8 illustrates the function of the stop wall 40 in establishing the extent of clockwise rotation of the heads 24 to their coupling positions, such coupling positions being illustrated in FIG. 14 in dotted outline.

From the foregoing it will be apparent that the couplers 10 are separable, integral structures which can be mounted to a container by simply dropping them into the recesses 14 of the corner castings 12. Thereafter, the simple step of lowering a second container onto the first container compresses the flanges 50 and 59 of the actuators 44 and 46, respectively, thereby tripping the locking heads 24 only when they are located in the corner casting recesses 14 and in proper alignment.

The side walls of the actuators 44 and 46 bear almost all shear loads, relieving the locking heads 24 of such shear loads and allowing them to move freely under most load conditions. In addition, since only the flanges 50 and 59 are located between the confronting surfaces of the coupled containers, the remainder of the couplers do not have to be constructed of materials heavy enough to bear the weight of the upper container or containers.

Various modifications and changes may be made with regard to the foregoing detailed description without departing from the spirit of the invention.

We claim:

1. A coupler for connecting together a pair of structures, said coupler comprising:
   actuating means including actuators engageable between the confronting surfaces of said pair of structures for relative movement along a predetermined axis between compressed positions and extended positions, according to whether said structures are moving toward or away from one another, respectively;
   locking means mounted to said actuating means and rotatable about said axis between coupling positions and decoupling positions;
   bias means biasing said actuators away from one another toward said extended positions and also biasing said locking means toward said coupling positions;
   first key means releasably locking together said locking means in said decoupling positions and said actuators in said extended positions, said first key means being actuable upon movement of said actuators into said compressed positions to release said locking means for biased rotation toward said coupling positions; and second key means releasably locking together said locking means in said decoupling positions and said actuators in said compressed positions upon reset rotation of said locking means to reset positions, said second key means being actuable upon movement of said actuators toward said extended positions to release said locking means for biased rotation toward said coupling positions, said first key means being operative for re-locking together said actuators and said locking means in said decoupling positions prior to said release of said locking means by said second key means, whereby said locking means remain in said decoupling positions under the bias of said bias means during said movement of said actuators toward said extended positions.

2. A coupler according to claim 1 wherein said locking means includes a pair of locking heads receivable in coupling relation within confronting recesses of said pair of structures.

3. A coupler according to claim 1 wherein said axis is generally coincident with the axis of travel of said structures toward and away from one another.

4. A plurality of couplers according to claim 2 in combination with a pair of standard cargo containers comprising said structures, and wherein said cargo containers include corner castings having recesses receiving said locking heads in coupling relation in said coupling positions of said locking heads.

5. A coupler according to claim 1 wherein said bias means comprises a compression spring in a twisted, pre-loaded condition exerting a torsional force against said locking means.

6. A coupler for coupling together a pair of cargo containers which are each characterized by a recess having an elongated entry opening thereto, the pair of recesses in said pair of containers being in confronting relation to effect said coupling, said coupler comprising:

a pair of actuators adapted to fit within said entry openings whereby said actuators are constrained against rotation relative to said containers, said actuators including engaging surfaces adapted to rest upon the margins defining said entry openings whereby said actuators are moved relative to one another along a predetermined axis between compressed positions when said containers are moved together and extended positions when said containers are separated;

locking means including a pair of heads mounted to said actuators outwardly thereof for rotation about said axis between decoupling positions, for insertion within said recesses of said containers, and coupling positions, in which said heads are disposed transversely of said entry openings, whereby said heads cannot be removed from said recesses;

bias means biasing said actuators away from one another and toward said extended positions and also biasing said locking heads toward said coupling positions;

first key means engaged upon and locking said locking heads to one of said actuators in said extended positions of said actuators, and disengageable from said locking heads upon location of said actuators in said compressed positions whereby said first key means normally constrains said locking heads against rotation until said actuators are moved toward one another by said pair of containers approaching one another;

second key means actuable for engagement and locking of said locking heads to one of said actuators in said decoupling positions of said locking heads and in said compressed positions of said actuators, and disengageable from said locking heads upon movement of said actuators toward said extended positions whereby said locking heads can be maintained in said decoupling positions despite location of said actuators in said compressed positions; and means enabling said engagement of said first key means with said locking heads prior to disengagement of said locking heads by said second key means upon movement of said actuators toward said extended positions whereby said locking heads are in said coupling positions upon location of said actuators in said extended positions.

7. A coupler according to claim 6 wherein said first key means comprises a key carried by said locking means and a slot formed in said one of said actuators and adapted to releasably receive said key.

8. A coupler according to claim 6 wherein said second key means comprises a pin carried by said one of said actuators, and a detent formed in said locking means and adapted to releasably receive said pin.

9. A coupler according to claim 6 wherein said heads include openings adapted to receive a reset tool whereby said heads can be manually rotated from said coupling positions to said decoupling positions against the bias of said bias means.

10. A coupler according to claim 6 wherein said bias means is a combination compression spring and torsion spring.

11. A coupler for coupling together a pair of cargo containers having confronting recesses, each recess being characterized by an elongated entry opening thereto, said coupler comprising:

a pair of actuators adapted to fit within the entry openings of a pair of confronting recesses and including side walls engageable with the edges defining said entry openings whereby said actuators tend to constrain said containers against lateral movement and said actuators are constrained against rotation relative to said containers, said actuators including, respectfully, confronting parallel flat plate sections having outer faces adapted to rest upon the exterior surfaces of the margins defining said entry openings whereby when said containers are moved together and apart said actuators are moved relative to one another along a predetermined axis between compressed positions and extended positions, respectively, the inner, confronting surfaces of said flat plate sections being pressed against one another in said compressed positions;

locking means including a pair of heads mounted to said actuators for rotation about said axis between decoupling positions for insertion within said recesses of said containers, and coupling positions in which said heads are disposed transversely of said entry openings whereby said heads cannot be removed from said recesses;

bias means biasing said actuators away from one another and toward said extended positions and also biasing said locking heads toward said coupling positions; and key means engaged upon and locking said locking heads to one of said actuators in said extended positions of said actuators, and disengageable from said locking heads upon location of said actuators in said compressed positions whereby said key means normally constrains said locking heads against rotation until said actuators are moved toward one another by said pair of containers approaching one another said flat plate sections comprising the only portions of said coupler interposed between and preventing engagement of the confronting surfaces of coupled-together cargo containers.

* * * * *